April 8, 1969

C. M. SMITH 3,437,980

INTERNAL, INTEGRALLY FORMED CORD GRIP FOR
ELECTRICAL WIRING DEVICES

Filed Dec. 11, 1967

WITNESSES:
Helen M. Farkas
E. Strickland

INVENTOR
Clarence M. Smith
BY
ATTORNEY

United States Patent Office 3,437,980
Patented Apr. 8, 1969

3,437,980
INTERNAL, INTEGRALLY FORMED CORD GRIP
FOR ELECTRICAL WIRING DEVICES
Clarence M. Smith, Bridgeport, Conn., assignor to Westinghouse Electric Corporation, Pittsburgh, Pa., a corporation of Pennsylvania
Filed Dec. 11, 1967, Ser. No. 689,506
Int. Cl. H01r 13/58, 13/50
U.S. Cl. 339—103                                           6 Claims

ABSTRACT OF THE DISCLOSURE

An electrical cord gripping assembly comprising a housing member having integrally formed cord gripping fingers effective to tightly grip a cord disposed therebetween when a cover means engages the fingers and is secured to the housing member.

Background of the invention

The invention relates to an electrical cord or cable gripping assembly particularly useful with wiring devices.

Electrical receptacle and plug wiring devices are usually provided with some form of cord gripping means designed to secure the cord wire connections within the devices against abuse, wear and strain, for example the strain resulting from using the cord as a means for removing the devices from mating plugs or receptacles.

Prior art electrical cord gripping means have generally involved the use of two metal, curved shaped pieces located externally of the wiring device housing and suitably attached thereto. The metal pieces are designed to seat around a cord connected in the wiring device, the two pieces being secured together around the cord by fastening hardware supported in lateral extensions of the pieces. Such externally located cord gripping means are uneconomical since the cost of the metal pieces and fastening hardware must be included in the cost of the final wiring device as well as the manufacturing costs involved in attaching the metal pieces to the housing of the wiring device.

The externally located cord gripping means are further unsightly and bothersome in that the lateral extensions and clamping hardware form projections for catching and tearing clothes, and for cutting or otherwise injuring those using wiring devices with such cord gripping means.

Non-metal, integrally formed cord gripping means have been developed in the prior art, but these means have followed the general unsightly configuration of the metal means, and have required the fastening hardware.

Brief summary of the invention

The present invention provides a simple and economical electrical cord gripping means by forming cord gripping fingers integral with a housing member designed to enclose internally disposed power conducting components and associated wire connecting hardware forming a part of wiring a device such as a male plug or a female receptacle, though the invention is not limited thereto. The integral fingers are formed about a cord receiving opening in the housing member, and extend generally in an axial direction of the housing member. A cover member is provided to cover the cord receiving end of the housing member, the cover member having a cord receiving opening, the edge of the opening engaging the outer surfaces of the fingers to force them in an inward direction as the cover is brought into securing engagement with the housing member. The inner surface of the fingers are thereby pressed against a centrally disposed cord or cable to secure it in the housing member against the force of external pulls and tugs.

With the above, briefly described structure, no metal fastening hardware is necessary to secure the cord and its connections in a wiring device. Further, the cord gripping means of the present invention is highly compact with the actual gripping fingers essentially hidden within a housing structure in contrast to the externally located and unsightly clamps with their lateral, hardware containing projections. Thus, the cord gripping means presently disclosed is a highly effective, compact device which is safer than the prior art devices since it has no bare metal hardware, it is a less expensive device since hardware items and assembly costs are eliminated, it is highly improved aesthetically since the unsightly, external structures of the prior art are eliminated, and, for the same reason the device is snagproof.

The drawings

The invention will be more apparent upon consideration of the following detailed description taken in connection with the accompanying drawing in which.

Preferred embodiment

Figure 1:
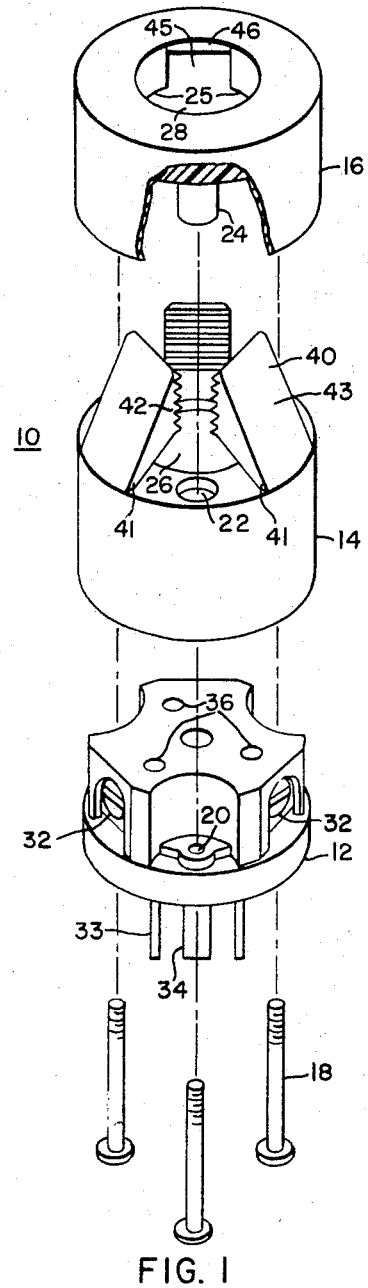
FIGURE 1 is an exploded isometric view of a wiring device constructed in accordance with the principles of the invention.
Figure 2:
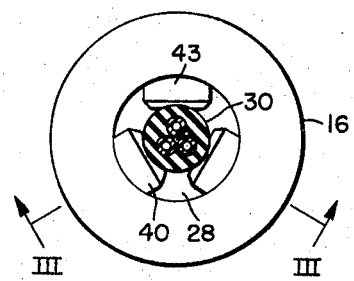
FIG. 2 is a top or rear view of the device shown in FIG. 1.
Figure 3:
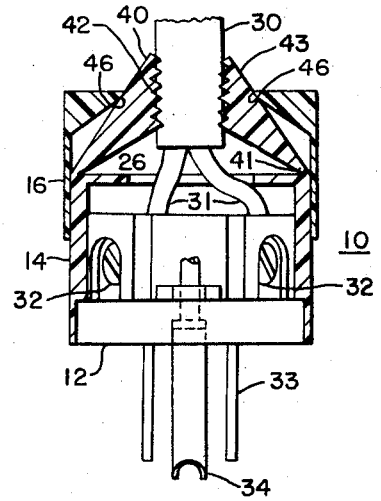
FIG. 3 shows a vertical section of the device taken along reference line III—III of FIG. 2.

Specifically, FIG. 1 shows an electrical wiring device assembly, generally designated 10, in the form of a male plug having an insulating base member 12, an intermediate housing or cover member 14 and an end cover 16. The base and intermediate housing members are dimensioned to fit together in the manner shown in FIG. 3. Similarly, the end cover 16 is dimensioned to fit over the housing 14 as shown in FIG. 3.

The base, housing and cover members 12, 14 and 16 respectively are secured together by threaded bolts 18 of sufficient length to extend through aligned holes 20 and 22, provided in the base and intermediate housing members 12 and 14, respectively, and into internally threaded posts 24 integrally formed on ledge portions 25 on the inside of the end cover 16. In the isometric view of FIG. 1, only one of each of the holes 20 and 22, is visible. Similarly, a single post is made visible by a portion of the end cover 16 being broken away.

The intermediate housing member 14 and the end cover 16 are further provided with centrally located openings 26 and 28 respectively for receiving a centrally disposed cord or cable 30 (FIG. 3), the component wires 31 of which are secured in wire clamping or terminal hardware 32 (only partially shown and visible) disposed within the insulating base member 12 and forming a part of the power blades 33 and grounding prong 34. The ends of the cord wires 31 extend into the base 12 through openings 36 provided in the top surface thereof to engage the wire clamping hardware 32.

In accordance with the invention, the intermediate housing member 14 is shown provided with cord gripping fingers 40 integrally formed on the end thereof, facing the end cover 16 and adjacent the cord receiving opening 26 provided in the member 14. The fingers extend generally in the axial direction of the housing member, and incline inwardly over the opening 26 to form an acute angle with the plane of the end of the housing member 14.

The fingers 40 are formed to have thin portions 41 near the location of their attachment to the housing member 14, and thick portions 42 near the outer, free ends thereof. The thin portions 41 allow the fingers to swing or pivot toward and away from the axial center of the housing member 14 while the thick portions provide increased surface area for contacting the centrally disposed cord 30. The cord contacting surfaces may be serrated, as shown, to further increase the amount of engaging friction between the fingers and the cord. The outer surfaces of the fingers are substantially flat, and form plane surfaces 43 inclining towards the axial center of the wiring device 10.

The housing member 14 with its integral fingers 40 may be formed by a suitable molding process using a material having a flexible characteristic which will allow the fingers to bend at the thin portions 41 thereof without easily breaking. Such a material would include nylon or other suitable materials having similar characteristics.

The ledge portions 25 within the end cover 16 are separated by channels or slots 45 having bevelled edges 46 formed peripherally about the cord receiving opening 28. The slots 45 are dimensioned to receive the fingers 40 when the end cover 16 and housing member 14 are placed together. In a similar manner the bevelled edges 46 are formed to engage the flat outer surfaces 43 of the fingers as best seen in FIG. 3. For this reason the number of the slots 45 and edges 46 correspond to that of the fingers 40.

To tighten the fingers 40 about a centrally disposed cord, cord 30 for example, and to securely fix the end of the cord in the wiring device 10 so that the wire connections within the base 12 are protected from the force of external pulls, the end cover 16 is brought into engagement with the intermediate housing member 14 so that the inner bevelled edges 46 of the cover 16 are brought to bear against the flat outer surfaces 43 of the fingers. As the cover and housing member are drawn together by the bolts 18 being threaded into the posts 24, for example, the bevelled edges 46 force the serrated surfaces of the fingers 40 against the cord 30 in a cord gripping manner. In this manner, the cord is firmly secured without further concern. No further tightening processes or hardware are needed.

The cord gripping structure, as thus far described, is completely universal so that cords or cables of any size (i.e., diameter) can be firmly gripped thereby, the only limitation on size being the diameter of the openings 26 and 28 in the housing and cover members 14 and 16, respectively.

As is further evident from the drawings, the wiring device 10 has no external projections and bare metal hardware for cord clamping purposes thus making said device neat in appearance, safer to use and snagproof. The end cover 16 may however be metal, if desired, as well as the housing member 14 and the integral fingers 40.

The wiring device 10 is further economical to manufacture since its component members including the cord gripping fingers 40 can be easily molded or otherwise formed to provide the structures and functions described above.

Though the invention has been described with a certain degree of particularity, changes may be made therein without departing from the spirit and scope thereof. For example, the number (three) of cord gripping fingers 40 shown in the drawings are given by way of example only, the use of more or less fingers being well within the purview of the disclosure. Similarly, the invention is not limited to male plugs as shown, but covers all types of wiring devices wherein it is desirable to protect wiring connections from abuse in an economical and convenient manner.

What is claimed is:
1. A cord grip assembly for an electrical wiring device, the assembly comprising
a housing member having an opening therein for receiving an electrical cord,
said housing member having further a plurality of finger elements, integrally formed about the opening and extending generally along the longitudinal axis of said housing member, each of said finger elements having an end portion for engaging said cord, and an opposite end portion disposed adjacent the one end of said housing member, each of said elements being further disposed to pivot at said opposite end portion,
a cover means for engaging said housing member, said cover means having an opening therein for receiving the electrical cord,
said opening in said cover means forming an edge or shoulder portion effective to engage said integrally formed finger elements, and to force said finger elements in an inward direction about said pivoting ends when said cover means engages said housing member,
said inwardly forced fingers being effective to grip an electrical cord extending through the opening in said cover means.

2. The assembly recited in claim 1 in which the integrally formed finger elements have flat outer surfaces, and the shoulder portion in the cover means is bevelled to engage the flat outer surfaces of the integrally formed finger elements.

3. The assembly recited in claim 1 in which a base member is secured to the housing member and the cover means by attaching bolts extending through the housing member.

4. The assembly recited in claim 1 in which the integrally formed finger elements have wide serrated surfaces for gripping the electrical cord.

5. In an electrical wiring device,
an insulating member for receiving the end of an electrical cord,
a plurality of finger elements disposed adjacent one end of said insulating member and extending generally along the longitudinal axis thereof, each of said finger elements having an end portion for engaging said cord, and an opposite end portion disposed adjacent the one end of said insulating member, each of said elements being further disposed to move relative to the one end of said insulating member,
means for engaging said finger elements, said means having an opening therein for receiving the electrical cord,
said engaging means being effective to force the cord engaging ends of said finger elements in a radially inward direction when engaging same, said elements inclining towards the axial center of said insulating member,
said inwardly forced finger elements being effective to grip an electrical cord passing through said opening.

6. The structure recited in claim 5 in which the plurality of finger elements are engaged and forced inwardly when the engaging means is disposed in further engagement with the base member.

References Cited

UNITED STATES PATENTS 3,123,662 3/1964 Fink _____ 339—107 X
3,188,380 6/1965 Lorenz _____ 339—103 X

FOREIGN PATENTS 227,379 3/1960 Australia.
401,161 11/1933 Great Britain.

RICHARD E. MOORE, Primary Examiner.

U.S. Cl. X.R.

339—206